United States Patent
Hoshino

(10) Patent No.: US 8,977,093 B2
(45) Date of Patent: Mar. 10, 2015

(54) MULTIMODE OPTICAL FIBER

(71) Applicant: Sumitomo Electric Industries, Ltd., Osaka (JP)

(72) Inventor: Sumio Hoshino, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/917,833

(22) Filed: Jun. 14, 2013

(65) Prior Publication Data

US 2014/0369658 A1 Dec. 18, 2014

(51) Int. Cl.
*G02B 6/02* (2006.01)
*G02B 6/028* (2006.01)

(52) U.S. Cl.
CPC .......... *G02B 6/02047* (2013.01); *G02B 6/0288* (2013.01); *G02B 6/028* (2013.01); *G02B 6/0281* (2013.01)
USPC .......................................... 385/124; 385/123

(58) Field of Classification Search
CPC .... G02B 6/028; G02B 6/0281; G02B 6/0288; G02B 6/02047
See application file for complete search history.

(56) References Cited

U.S. PATENT DOCUMENTS

| | | | | |
|---|---|---|---|---|
| 4,129,433 A * | 12/1978 | Jaeger et al. | | 65/392 |
| 4,163,370 A * | 8/1979 | Kurth | | 65/402 |
| 4,163,601 A * | 8/1979 | Olshansky | | 385/28 |
| 4,479,910 A * | 10/1984 | Kurokawa et al. | | 264/2.5 |
| 4,665,660 A * | 5/1987 | Jablonski et al. | | 451/28 |
| 5,267,339 A * | 11/1993 | Yamauchi et al. | | 385/123 |
| 6,576,058 B2 * | 6/2003 | Oishi et al. | | 118/420 |
| 7,787,731 B2 * | 8/2010 | Bookbinder et al. | | 385/124 |
| 7,865,050 B1 * | 1/2011 | Sun | | 385/123 |
| 2004/0129030 A1 * | 7/2004 | Tanada et al. | | 65/397 |
| 2008/0166094 A1 * | 7/2008 | Bookbinder et al. | | 385/124 |
| 2010/0319405 A1 * | 12/2010 | Okada | | 65/430 |
| 2013/0071079 A1 * | 3/2013 | Peckham et al. | | 385/124 |
| 2013/0243379 A1 * | 9/2013 | Yonezawa et al. | | 385/123 |

FOREIGN PATENT DOCUMENTS

JP 62-131210 A 6/1987

* cited by examiner

*Primary Examiner* — Rhonda Peace
(74) *Attorney, Agent, or Firm* — Drinker Biddle & Reath LLP

(57) ABSTRACT

The present invention relates to a multimode optical fiber having a structure for stably reducing eccentricity relative to an insert hole of a connector ferrule to be mounted at an end thereof, wherein a fiber outer diameter of the multimode optical fiber along its longitudinal direction varies periodically in a range of $\pm 0.5$ μm with respect to a target fiber outer diameter.

3 Claims, 6 Drawing Sheets

MULTIMODE OPTICAL FIBER

BACKGROUND OF THE INVENTION

1. Field of the Invention

The present invention relates to a multimode optical fiber.

2. Related Background Art

The multimode optical fibers allow easy splicing between fibers and easy construction of networks using equipment with low required performance and therefore are commonly used in application of short-haul information transmission like a LAN (Local Area Network). Particularly, the multimode optical fibers are often used in a rather short length for optical fiber, e.g., in the cable length of not more than 500 m, and are generally used with connectors attached to their two ends.

SUMMARY OF THE INVENTION

The Inventor conducted research on the conventional multimode optical fibers applied to optical fiber cables with the connectors attached thereto and found the problem as described below. It is noted that in the present specification a simple expression of "optical fiber" without any specific note shall mean "multimode optical fiber."

For example, FIG. 1A shows a process of attaching a connector ferrule 20 to a tip portion of a coated optical fiber 12 wound on a bobbin 11. The coated optical fiber 12 is composed of a multimode optical fiber 100 and a resin coat covering an outer peripheral surface of the multimode optical fiber 100.

In a standard attaching process of the connector ferrule 20, the resin coat is first removed from the tip portion of the coated optical fiber 12 to expose a glass part (the multimode optical fiber 100 with the fiber outer diameter D1). Subsequently, the glass part coated with an adhesive such as an ultraviolet (UV) curable resin on its surface is inserted through an insertion opening 20a of the connector ferrule 20 into a fiber insert hole 20b for holding the glass part (which is a through hole having an inner diameter D2) and in that state, the adhesive is cured by irradiation with UV light. Thereafter, the end face of the ferrule is polished and then a housing member is attached to the tip portion of the coated optical fiber 12 (including the connector ferrule 20 with the polished end face), thereby obtaining an optical connector.

Japanese Patent Application Laid-Open No. S62-131210 (Patent Literature 1) describes the size of the fiber insert hole 20b made in the connector ferrule 20. According to the description of Patent Literature 1, the diameter of the fiber insert hole always needs to be larger than the diameter D1 of the optical fiber to be used, and the fiber insert hole 20b of the connector ferrule 20 is provided with a clearance of at least 1 μm. Reasons for it include ensuring insertability of the optical fiber into the fiber insert hole 20b and allowing the adhesive to flow into the clearance part.

However, if there is the clearance of "at least 1 μm," as also shown in FIG. 1B, the optical axis AX of the inserted optical fiber will become significantly eccentric with respect to a center O of the fiber insert hole 20b and influence of the eccentricity cannot be ignored. The eccentricity cannot be stably reduced as long as there is the foregoing clearance.

The present invention has been accomplished to solve the above problem and it is an object of the present invention to provide a multimode optical fiber having a structure for stably reducing the eccentricity relative to the insert hole of the connector ferrule to be mounted at an end thereof.

The present invention relates to a GI (Graded Index) multimode optical fiber with a GI type refractive-index profile including a region in which the refractive index continuously decreases along the radial direction from the central axis, and the multimode optical fiber is definitely discriminated in terms of structure from single-mode optical fibers for long-haul transmission. The GI multimode optical fiber includes a GI multimode optical fiber with a trench part of a low refractive index provided on an outer peripheral surface of a core (which will be referred to hereinafter as BI multimode optical fiber), as well as the multimode optical fiber with the general structure composed of a high-index core and a low-index cladding. The trench part has the refractive index lower than the peripheral region such as the cladding, and provides the multimode optical fiber with resistance to variation of transmission performance due to bending. The trench part may be located between the core and the cladding or in the cladding at a predetermined distance apart from the core.

A multimode optical fiber according to an embodiment of the present invention comprises: a core extending along a central axis and having an α-power index profile in which a refractive index continuously decreases along a radial direction from the central axis; and a cladding surrounding an outer peripheral surface of the core. The multimode optical fiber according to the embodiment also includes a BI multimode optical fiber with a trench part having a refractive index lower than the cladding, between the core and the cladding or in the cladding.

Particularly, in the multimode optical fiber of the embodiment, a fiber outer diameter of the multimode optical fiber along a longitudinal direction thereof varies periodically in a range of ±0.5 μm with respect to a target fiber outer diameter. The multimode optical fiber comprises a first region with a fiber outer diameter larger than the target fiber outer diameter and a second region with a fiber outer diameter smaller than the target fiber outer diameter, and the first and second regions are alternately arranged along the longitudinal direction of the multimode optical fiber. The fiber outer diameter becomes maximum at some position in the first region. The fiber outer diameter becomes minimum at some position in the second region.

Furthermore, in a relation between a distance along the longitudinal direction of the multimode optical fiber and the fiber outer diameter, maxima of the fiber outer diameter or minima of the fiber outer diameter along the longitudinal direction appear in a predetermined period (e.g., the period can be optionally designed approximately in the range of 50 cm to 50 m) along the longitudinal direction.

Each of embodiments according to the present invention can become more fully understood from the detailed description given hereinbelow and the accompanying drawings. These embodiments are presented by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and it is apparent that various modifications and improvements within the scope of the invention would be obvious to those skilled in the art from this detailed description.

DETAILED DESCRIPTION OF THE PREFERRED EMBODIMENTS

Each of embodiments of the multimode optical fiber according to the present invention will be described below in detail with reference to the accompanying drawings. The same elements will be denoted by the same reference signs in the description of the drawings, without redundant description.

Typically, the multimode optical fiber is often used in the form of an optical fiber cable with a connector at an end thereof and precise agreement between the centers of the connector ferrule and the fiber in the connector attaching work is important to stabilization of quality.

In manufacture of the multimode optical fiber, however, it is common practice to set the fiber outer diameter to 125 μm as a target outer diameter, and in fact an average of the fiber outer diameter varies approximately by ±0.5 μm among manufactured products because of manufacturing error. For this reason, the inner diameter of the connector ferrule (inner diameter of the insert hole) attached to an end of the manufactured multimode optical fiber needs to be made slightly larger by the degree of the variation among products. In this case, the insertion position of the optical fiber varies on a fiber-by-fiber basis among manufactured optical fibers because of the existence of the clearance relative to the attached connector and, in addition thereto, the size of the clearance also varies, so as to result in further variation of the eccentric state, failing to stabilize the eccentric state of the multimode optical fiber relative to the connector.

In the multimode optical fiber according to the present embodiment, the fiber outer diameter along the longitudinal direction thereof is designed intentionally to vary in the range of ±0.5 μm with respect to a target fiber outer diameter. By the intentional variation of the fiber outer diameter around the center of the target fiber outer diameter in this manner, we obtain the multimode optical fiber in which portions with the target fiber outer diameter exist periodically. The present invention aims to stably reduce the eccentricity of the fiber center relative to the fiber insert hole of the connector ferrule, by subjecting the multimode optical fiber to an end processing procedure for attachment of the connector with reference to the portion of the target fiber outer diameter.

Figure 2A:
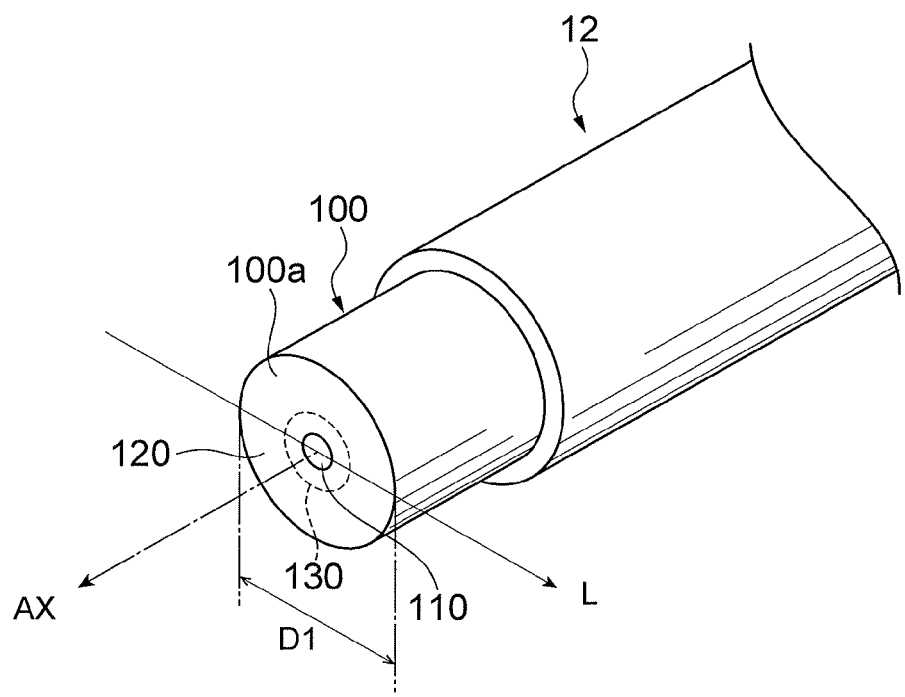
FIG. 2A is a drawing showing an example of sectional structure in a multimode optical fiber according to the present invention, and FIG. 2B a refractive-index profile thereof.
Figure 2B:
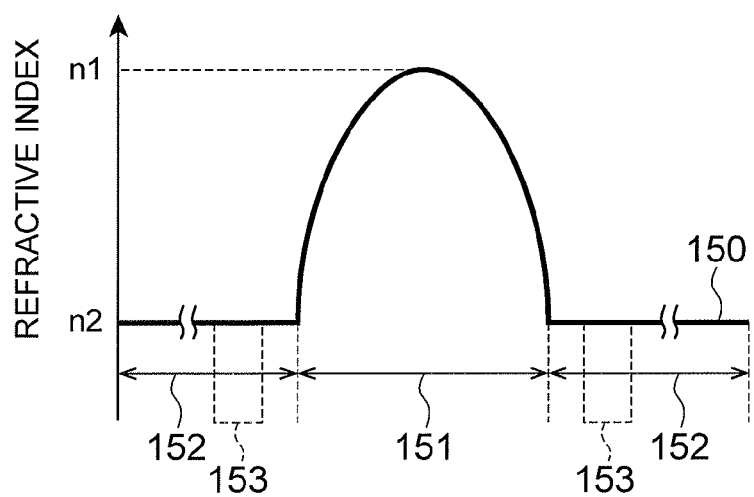

First, FIG. 2A is a drawing showing an example of sectional structure in the multimode optical fiber according to the present invention, and FIG. 2B a refractive-index profile thereof. The multimode optical fiber 100 shown in FIG. 2A is a GI multimode optical fiber having a core 110 consisting primarily of silica glass and extending along a central axis (optical axis AX), and a cladding 120 surrounding an outer peripheral surface of the core 110. The core 110 has an α-power index profile with a maximum refractive index n1 at a center thereof (a position coincident with the optical axis AX). The cladding 120 has a refractive index n2 lower than the maximum refractive index n1 of the core 110 and an outer diameter thereof (fiber outer diameter) is D1. The multimode optical fiber 100 has an end face 100a cut for connection to a connector. In the case of the BI multimode optical fiber, a trench part 130 with a refractive index lower than the cladding 120 is provided between the core 110 and the cladding 120, or in the cladding 120.

The multimode optical fiber 100 has the refractive-index profile 150 shown in FIG. 2B. The refractive-index profile 150 shown in FIG. 2B shows refractive indices of respective parts on a line L perpendicular to the optical axis AX and corresponds to a refractive-index profile along the direction of the diameter of the multimode optical fiber 100. Specifically, a region 151 having the maximum refractive index n1 and the refractive index continuously decreasing in the radial direction from the center of the core (coincident with the optical axis AX) corresponds to the core 110, and a region 152 around the region 151 corresponds to the cladding 120. A region 153 indicates a region corresponding to the trench part in the BI multimode optical fiber.

Figure 3:
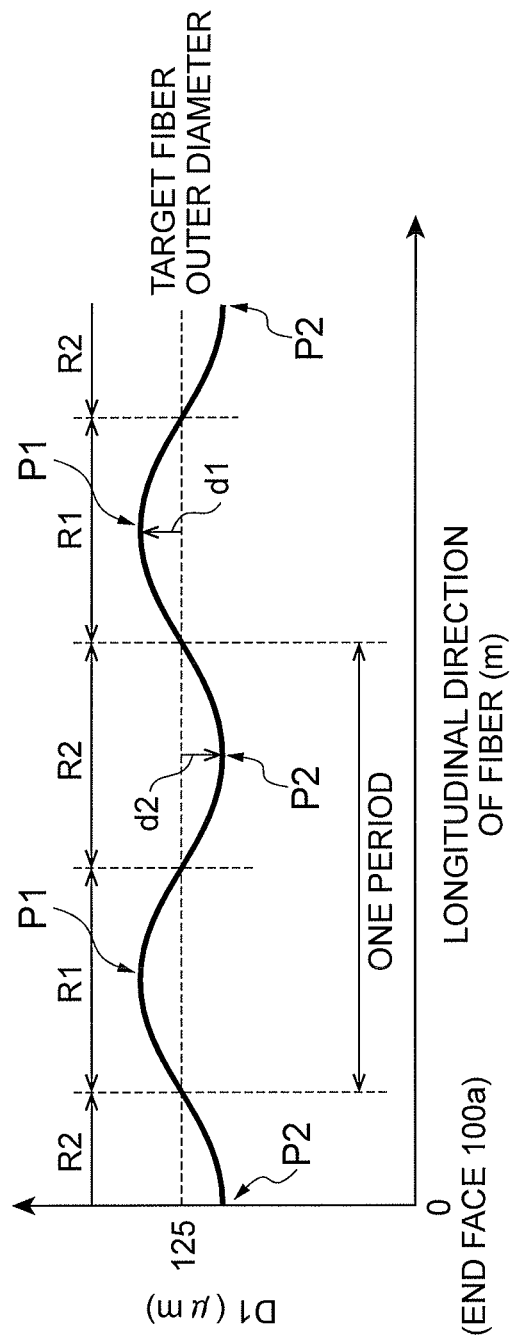
FIG. 3 is a graph showing variation of fiber outer diameter along the longitudinal direction, of the multimode optical fiber according to an embodiment of the present invention.

The multimode optical fiber 100 of the present embodiment has the sectional structure as described above and is defined by a structural feature along the longitudinal direction thereof. Namely, the multimode optical fiber 100 has the fiber diameter varying periodically in the range of ±0.5 μm with respect to the target fiber diameter (125 μm in general). FIG. 3 is a graph showing the variation of the fiber outer diameter along the longitudinal direction of the multimode optical fiber according to the present embodiment.

The multimode optical fiber 100 of the present embodiment is designed so that regions R1 (first regions) with the fiber outer diameter larger than the target fiber outer diameter and regions R2 (second regions) with the fiber outer diameter smaller than the target fiber outer diameter are alternately arranged along the longitudinal direction thereof. In each of the regions R1 there is a maximum P1 of the fiber outer diameter at some position, while in each of the regions R2 there is a minimum P2 of the fiber outer diameter at some position. A difference d1 between the target fiber diameter and the maximum P1 of the fiber outer diameter is not more than 0.5 μm and a difference d2 between the target fiber diameter and the minimum P2 of the fiber outer diameter is also not more than 0.5 μm. The multimode optical fiber 100 of the present embodiment has the fiber diameter varying periodically along the longitudinal direction thereof, in the range of ±0.5 μm with respect to the target fiber diameter. In the present specification, a distance of one region R1 plus one region R2 subsequent thereto (wherein one position with the target fiber diameter exists in a section excluding the two ends) is defined as one period of fiber diameter variation periods.

Figure 4:
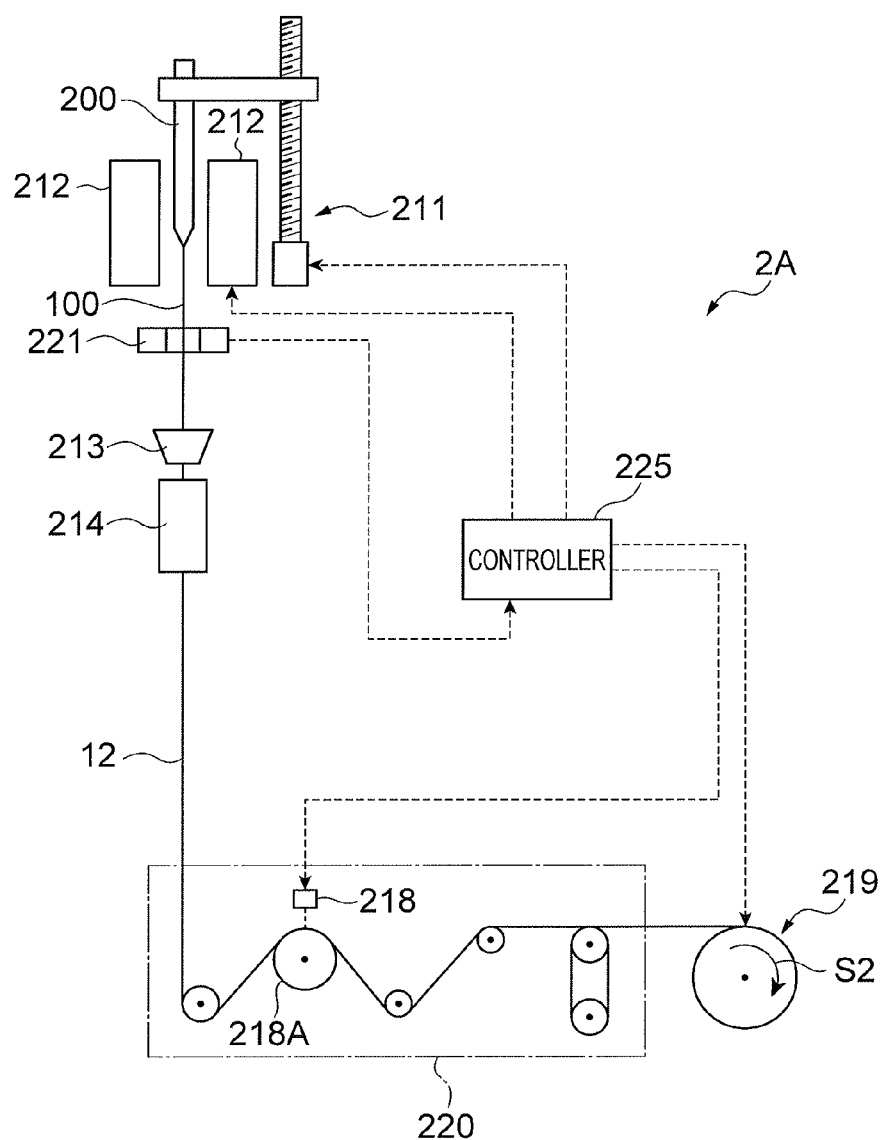
FIG. 4 is a drawing showing a first configuration of a fiber drawing device for manufacturing the multimode optical fiber according to the embodiment.

The multimode optical fiber 100 with the above-described sectional structure and structure along the longitudinal structure is obtained, for example, by an optical fiber manufacturing device 2A (fiber drawing device) shown in FIG. 4.

The optical fiber manufacturing device 2A shown in this FIG. 4 has at least: a heating furnace 212 for softening a part of an optical fiber preform 200 for the multimode optical fiber 100 of the present embodiment; a feeding device 211 for controlling a relative position of the optical fiber preform 200 to the heating furnace 212; an outer diameter measuring device 221; a coating die 213 for applying a resin coat onto the outer peripheral surface of the multimode optical fiber 100 drawn; a UV radiating device 214 for curing the applied resin coat; a take-up section 220 for taking up the coated optical fiber 12 obtained; a winding drum 219; and a controller 225 for controlling each of parts of the optical fiber manufacturing device 2A. The take-up section 220 is composed of a plurality of rollers, among which a capstan roller 218A to take up the coated optical fiber 12 between the rollers is provided with a speed regulator 218 for regulating a drawing speed. When a plurality of resin layers are laid on the outer peripheral surface of the drawn multimode optical fiber 100, a plurality of sets each consisting of the coating die and the UV radiating device may be arranged between the outer diameter measuring device 221 and the take-up section 220.

In the optical fiber manufacturing device 2A shown in FIG. 4, the optical fiber preform 200 consisting primarily of silica glass is guided into the heating furnace 212 and fed downward by the feeding device 211. The lower end of the optical fiber preform 200 heated and melted by the heating furnace 212 is drawn to obtain the multimode optical fiber 100 (glass fiber). This multimode optical fiber 100 passes through the coating die 213 filled with a resin, to be coated with a resin coat on the outer peripheral surface thereof and the resin coat is cured by irradiation with UV light from the UV radiating device 214. The coated optical fiber 12 obtained in this manner is wound up via each of the rollers in the take-up section 220 including the speed regulator 218, onto the winding drum 219.

The outer diameter measuring device 221 is arranged between the heating furnace 212 and the coating die 213. The outer diameter measuring device 221 is an optical device and the outer diameter measuring device 221 measures the outer diameter of the multimode optical fiber 100 immediately after drawn.

The result of the measurement by the outer diameter measuring device 221 is sent to the controller 225. Then the controller 225 controls the drawing speed, the furnace temperature in the heating furnace 212, and so on. The drawing speed is regulated by the speed regulator 218. These drawing speed, furnace temperature, etc. are not factors that can be independently controlled, but they affect each other.

A sample of the multimode optical fiber 100 of the present embodiment manufactured using the aforementioned optical fiber manufacturing device 2A will be described below. Namely, the optical fiber preform 200 (having a shape similar to the sectional structure in FIG. 2A and having a refractive-index profile of the same shape as FIG. 2B) for the multimode optical fiber 100 is mounted on the feeding device 211 and guided into the heating furnace 212. Thereafter, the furnace temperature is raised to 2000° C. and fiber drawing is started. On that occasion, the target fiber outer diameter is set to 125.0 µm and the fiber drawing is carried out with 1% variation of the drawing speed under control in the period of 50 m. As a result, we obtain the multimode optical fiber 100 with the fiber outer diameter varying periodically in the range of 124.5 to 125.5 µm.

Figure 5A:
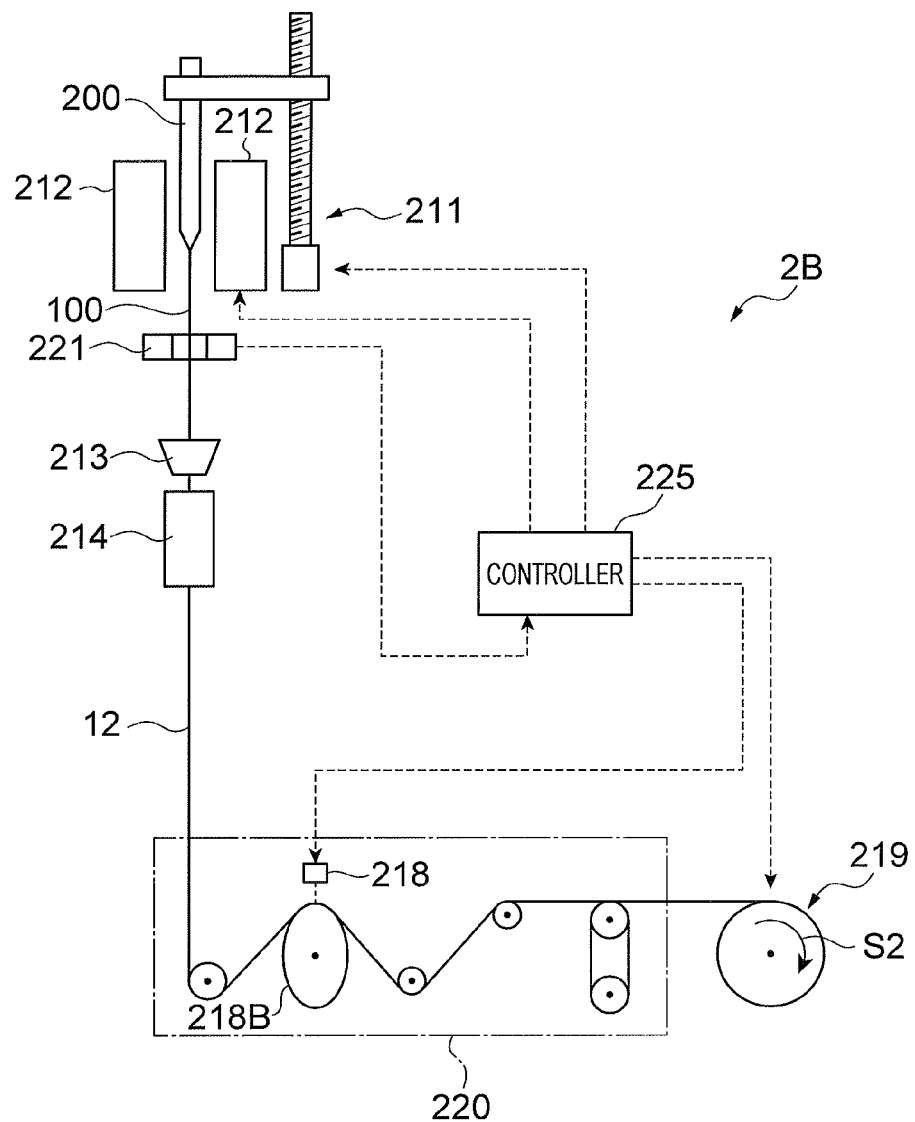
FIG. 5A is a drawing showing a second configuration of the fiber drawing device for manufacturing the multimode optical fiber according to the embodiment and FIG. 5B a drawing for explaining a sectional shape of a roller to which a speed regulator for regulating a drawing speed is attached.
Figure 5B:
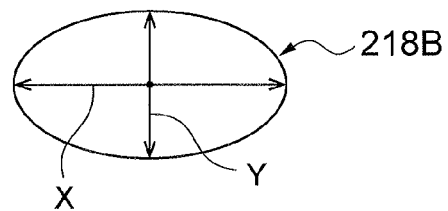

The multimode optical fiber 100 of the present embodiment can also be manufactured by an optical fiber manufacturing device 2B shown in FIGS. 5A and 5B.

Specifically, the optical fiber manufacturing device 2B shown in FIG. 5A has at least the heating furnace 212, feeding device 211, outer diameter measuring device 221, coating die 213, UV radiating device 214, take-up section 220, winding drum 219, and controller 225 for controlling each of parts of the optical fiber manufacturing device 2B.

This optical fiber manufacturing device 2B shown in FIG. 5A is structurally different from the optical fiber manufacturing device 2A shown in FIG. 4, in the sectional shape of capstan roller 218B provided in the take-up section 220, i.e., in the sectional shape of the capstan roller 218B equipped with the speed regulator 218. A cross section of the capstan roller 218B has an elliptical shape with the major axis X and the minor axis Y as shown in FIG. 5B. By using the capstan roller 218B having such sectional shape, it becomes feasible to realize variation of the fiber outer diameter in a shorter period in a state in which the fiber drawing speed by the speed regulator 218 is kept constant.

The optical fiber manufacturing device 2B shown in FIG. 5A is the same as the optical fiber manufacturing device 2A shown in FIG. 4, in the device configuration and operation, except for the shape of the capstan roller 218B in the take-up section 220 as described above.

A sample of the multimode optical fiber 100 of the present embodiment manufactured using the aforementioned optical fiber manufacturing device 2B will be described below. The capstan roller 218B attached to the speed regulator 218 has the cross section of the elliptical shape with the circumference of 1 m. The optical fiber preform 200 (having a shape similar to the sectional structure in FIG. 2A and having a refractive-index profile of the same shape as FIG. 2B) for the multimode optical fiber 100 is mounted on the feeding device 211 and guided into the heating furnace 212. Thereafter, the furnace temperature is raised to 2000° C. and fiber drawing is started. On that occasion, the target fiber outer diameter is set to 125.0 µm and the fiber drawing is carried out under control. As a result, we obtain the multimode optical fiber 100 with the fiber outer diameter varying in a period of 50 cm.

Figure 1A:
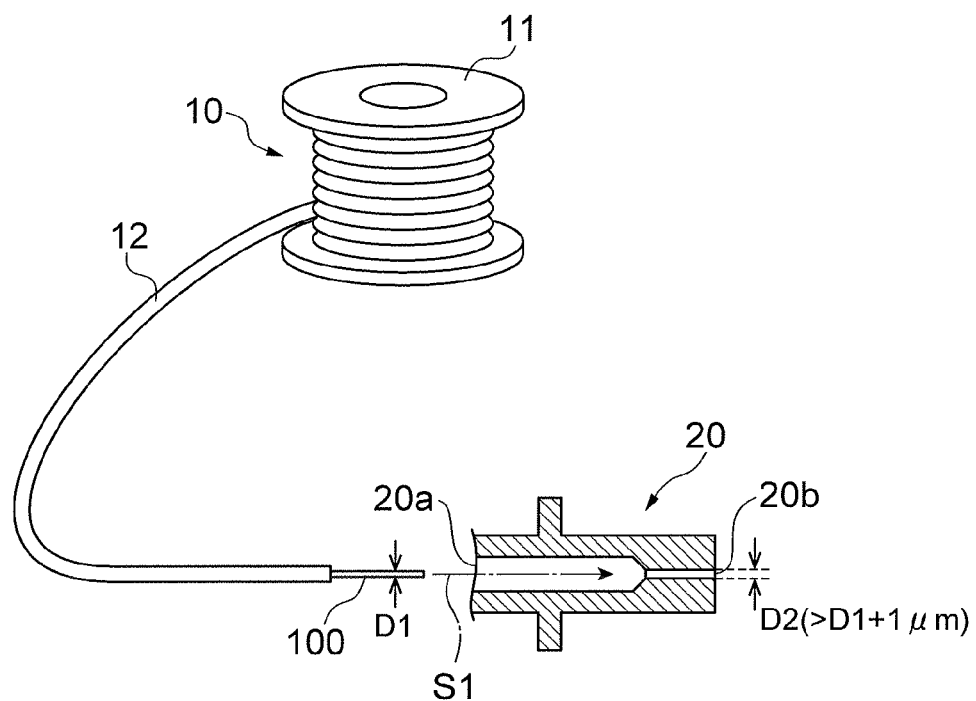
FIG. 1A is a drawing for explaining a general manufacturing process of a connector-attached optical fiber cable, and FIG. 1B a drawing for explaining an eccentric state of the optical axis of an optical fiber relative to a center of an optical fiber insert hole of a connector ferrule.
Figure 1B:
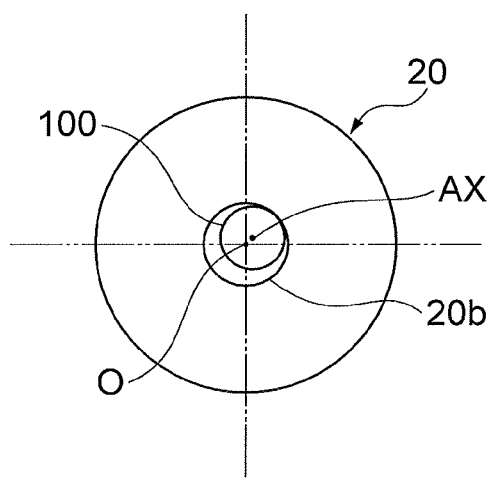
Figure 6:
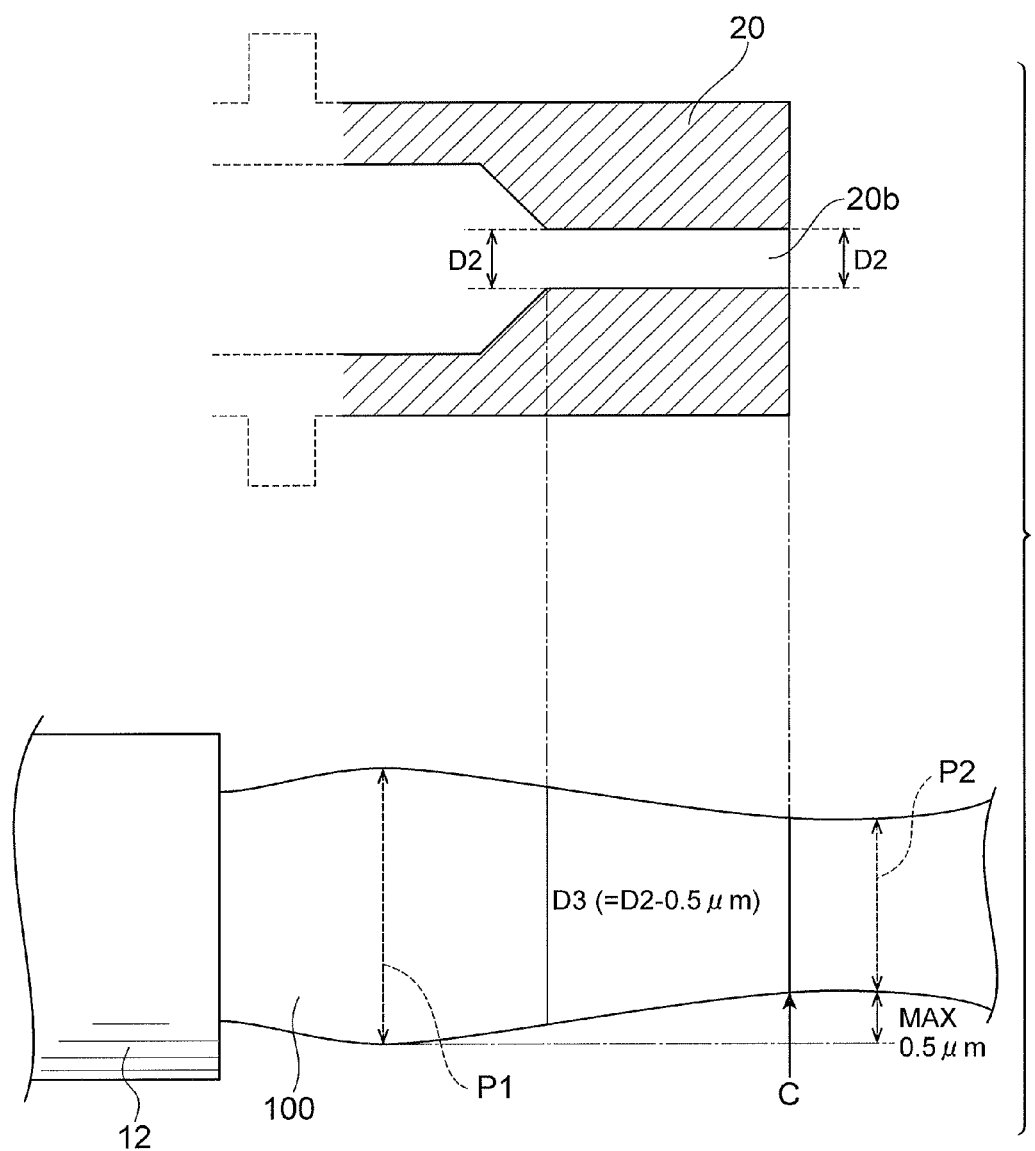
FIG. 6 is a drawing for explaining a step of attaching a connector ferrule to a tip of a coated optical fiber including the multimode optical fiber according to the embodiment.

FIG. 6 is a drawing for explaining a step of attaching the connector ferrule to the tip of the coated optical fiber 12 (including the multimode optical fiber 100 of the present embodiment) manufactured by the optical fiber manufacturing device 2A or 2B as described above. The basic attaching step of the connector ferrule 20 is the same as the standard attaching step of the connector ferrule 20 shown in FIG. 1A, except for the end cutting step in the multimode optical fiber 100.

Specifically, the resin coat is first removed from the tip portion of the coated optical fiber 12 to expose the multimode optical fiber 100. In the exposed multimode optical fiber 100, the fiber outer diameter varies periodically in the range in which the difference between the maximum P1 and the minimum P2 of the fiber outer diameter is at most 1.0 µM. Subsequently, in a section in which the region R2 (region with the fiber outer diameter smaller than the target fiber outer diameter) and the region R1 (region with the fiber outer diameter larger than the target fiber outer diameter) are arranged in the named order from one end to which the connector ferrule 20 is attached, toward the other end, a position where the fiber outer diameter of the multimode optical fiber 100 is D3 (e.g., a fiber outer diameter smaller by 0.5 µm than the inner diameter D2 of the fiber insert hole 20b of the connector ferrule 20) is specified and the multimode optical fiber 100 is cut at a position C distant by the length of the fiber insert hole 20b from the specified position on the one end side. A cut face of the multimode optical fiber 100 at this position C becomes the fiber end face 100a (cf. FIG. 2A).

Furthermore, after the cutting, the exposed part of the exposed multimode optical fiber 100 coated with an adhesive (UV curable resin) on a surface is inserted through the insertion opening 20a of the connector ferrule 20 into the fiber insert hole 20b and in that state, the adhesive is cured by irradiation with UV light. Thereafter, the ferrule end face is polished and the housing member is further attached to the tip portion of the coated optical fiber 12 (including the connector ferrule 20 with the end face polished), thereby obtaining an optical connector.

Since the multimode optical fiber 100 of the present embodiment is manufactured with the fiber outer diameter varying periodically as described above, there is always a portion close to the target fiber outer diameter. Furthermore, positions where the outer diameter is the fiber outer diameter D3 calculated from the inner diameter of the fiber insert hole 20b of the connector ferrule 20 to be attached, also appear periodically along the longitudinal direction of the multimode optical fiber 100. Since the multimode optical fiber is used in a fixed length depending upon application thereof, the fiber outer diameter can be varied in a period corresponding to the period of the used length whereby the end from which the resin coat is removed always becomes a portion where the fiber outer diameter is closest to the target diameter. Therefore, for example, when the multimode optical fiber 100 is one wherein the fiber outer diameter varies in the period in the range of about 50 cm to 50 m, it can be used as an optical fiber in a length of a multiple of the variation period of the fiber outer diameter.

Since the multimode optical fiber of the present embodiment is manufactured with the fiber outer diameter varying periodically as described above, we can select the fiber outer diameter that provides the clearance (in a uniform size in each fiber) optimal to the inner diameter of the insert hole of the connector. Since the manufactured multimode optical fiber is usually shipped after cut so as to facilitate attachment to the connector, precise measurement of outer diameter and cutting of fiber can be performed in advance before shipping.

From the above description of the present invention, it will be obvious that the invention may be varied in many ways. Such variations are not to be regarded as a departure from the spirit and scope of the invention, and all improvements as would be obvious to those skilled in the art are intended for inclusion within the scope of the following claims.

What is claimed is:

1. A multimode optical fiber having a glass portion composed of silica glass, the glass portion consisting of:
    a core extending along a central axis and having an alpha-power index profile;
    a cladding surrounding an outer peripheral surface of the core and optionally a trench portion that is located in the cladding,
    wherein an outer diameter of the cladding along a longitudinal direction thereof varies periodically in a range of ±0.5 μm with respect to a target outer diameter of the cladding.

2. A multimode optical fiber having a glass portion composed of silica glass, the glass portion consisting of:
    a core extending along a central axis and having an alpha-power index profile;
    a cladding surrounding an outer peripheral surface of the core and optionally a trench portion that is located in the cladding,
    wherein a maximum variation of an outer diameter of the cladding along a longitudinal direction thereof is in a range of ±0.5 μm with respect to a target outer diameter of the cladding,
    wherein the glass portion comprises a first region as a region having an outer diameter larger than the target outer diameter and taking a maximum of the outer diameter at some position, and a second region as a region having an outer diameter smaller than the target outer diameter and taking a minimum of the outer diameter at some position, the first and second regions being alternately arranged along the longitudinal direction.

3. The multimode optical fiber according to claim 2, wherein in a relation between a distance along the longitudinal direction and the outer diameter, maxima of the outer diameter or minima of the outer diameter appear in a predetermined period along the longitudinal direction.

* * * * *